Oct. 19, 1965                D. R. CONLON                3,212,334
                          SIGHT GLASS PROTECTOR
                          Filed Dec. 23, 1964
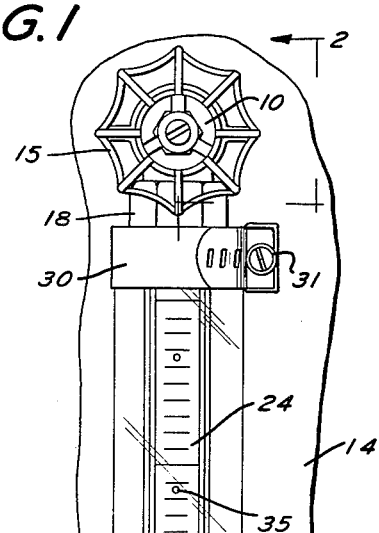
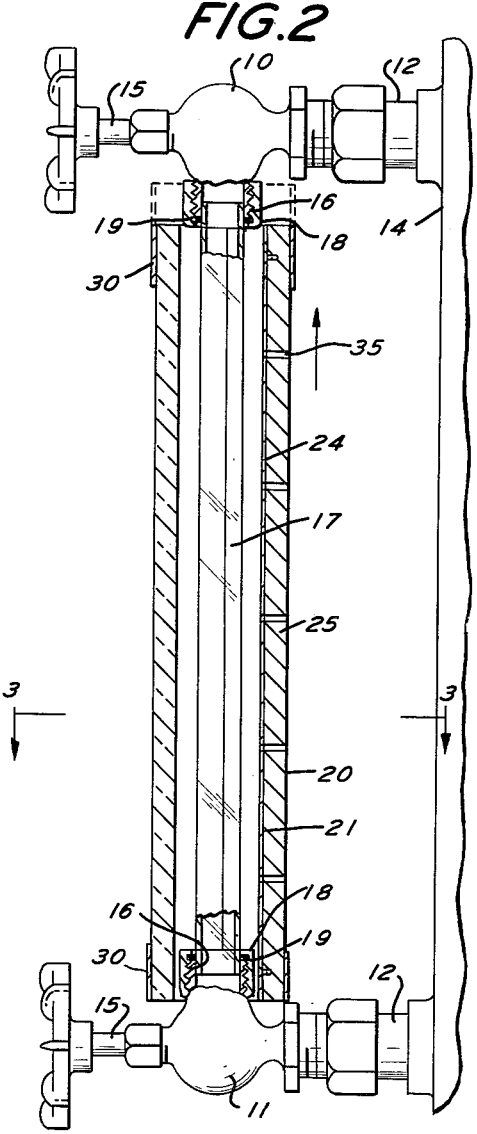
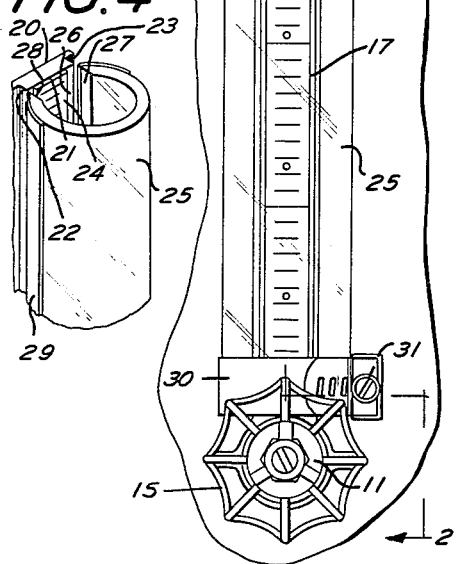
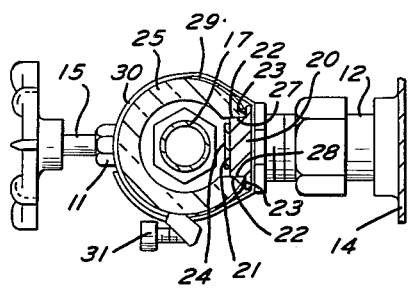
INVENTOR
DANIEL R. CONLON
BY
ATTORNEY 3,212,334
SIGHT GLASS PROTECTOR
Daniel R. Conlon, Jenkintown, Pa. (% Instruments for Research & Industry, 108 Franklin Ave., Cheltenham, Pa.)
Filed Dec. 23, 1964, Ser. No. 420,572
1 Claim. (Cl. 73—326)

This invention relates to sight glass protectors.

Sight glasses for observing the liquid level in tanks, pressure vessels and the like are in common use. While it has heretofore been proposed to provide protectors these have been relatively complex, did not permit of ready adjustment of the glands of the sight glass, could not be readily installed on sight glasses now in use or had other shortcomings.

It is the principal object of the present invention to provide a sight glass protector which is simple in construction, can be quickly and easily applied to and removed from existing sight glasses, and which permits of ready access for adjustment of the glands of the sight glass, if desired.

It is a further object of the present invention to provide a sight glass protector having components which can be readily cut to length as required for a particular installation.

It is a further object of the present invention to provide a sight glass protector having a straight flat rear opaque section to which a scale can be attached if desired and a transparent cylindrical front section to part of which a white coating can be applied for enhancing the visibility of liquid in the column of the sight glass, together with upper and lower strap clamps.

Other objects and advantageous features of the invention will be apparent from the description and claim.

The nature and characteristic features of the invention will be more readily understood from the following description taken in connection with the accompanying drawings forming part thereof, in which:

FIGURE 1 is a front elevational view of a sight glass having the protector of the invention applied thereto;

FIG. 2 is a vertical sectional view taken approximately on the line 2—2 of FIG. 1;

FIG. 3 is a horizontal sectional view taken approximately on the line 3—3 of FIG. 2; and FIG. 4 is a fragmentary perspective view of the top end of the protector tube and back strip.

Referring now more particularly to the drawings a sight glass assembly of conventional type is illustrated and includes upper and lower fittings 10 and 11 connected by threaded nipples 12 or the like to the portion of a tank or pressure vessel 14 at which observation of the liquid level is desired. The fittings 10 and 11 each have manually operable valves 15 for shutting off the flow and aligned threaded openings 16 within which the ends of a transparent tubular gage glass 17 are received. Gland nuts 18 threaded in the openings 16 and with packings 19 engaging the glass 17 are provided, for preventing leakage, in the conventional manner.

In accordance with the present invention a back strip 20 is provided preferably of light weight corrosion resistant material such as aluminum, magnesium, or synthetic plastic. The back strip 20 has an inner face 21 along the edges of which ledges are provided bounded by faces 22 and 23. The back strip 20 can have extending therealong a scale 24 for checking the height of the liquid within the gage glass 17. The back strip 20 may, if desired, be provided with a plurality of spaced vent holes 35 to permit the escape of gas or liquid, if that becomes necessary, and at a more remote location than the front.

A front cylindrical tube 25 is provided of transparent material, and preferably of synthetic plastic material having a reduced or low tendency to shatter or fracture. An acrylic resin has been found suitable. The tube 25 has a slot 26 of a width equal to or at least slightly in excess of the diameter of the glass 17 for assembly of the tube 25 over a gage glass 17 previously mounted in position for use. The slot 26 has edge faces 27 and 28 complemental to the ledge faces 22 and with the periphery of the tube 25 engaging the ledge faces 23. The ledge faces 22 and 23 and the edge faces 27 and 28 can be of any desired complemental shape.

Spaced portions of the tube 25 along either side of the slot 26 and contiguous to the strip 20 can have a coating 29 of white, yellow or other light colored material, applied thereto to facilitate viewing the level of the liquid in the glass tube 17.

The back strip 20 and tube 25 are preferably of the same length, that length being slightly greater than the distance between the gland nuts 18 with which they are in partially overlapping relation, for tightening the same. The overlap of the nuts 18 by the tube 25 is adequate for protection of the sight glass. The nuts 18 are accessible for tightening. Additional accessibility results from sliding the tube 25 or the entire assembly up and down.

The tube 25 can be held in engagement with the strip 20 in any desired manner as by friction but it is preferred to retain the tube 25 and strip 20 in assembled relation by upper and lower straps 30 having screws 31 for adjustment of the straps 30, extending circumferentially of the tube 25 and around the rear of the strip 20. These straps 30 additionally strengthen the assembly against internal pressure should the sight glass yield to high internal pressure.

The back strip 20 can be secured in position with respect to the tank or pressure vessel 14, by extension straps or clamps going to the tank, if desired.

It will be noted that when the slot 26 is equal to or larger than the outside diameter of the glass 17 the sight glass protector can be readily mounted in place on gage glasses 17 now in use and that the assembly can be quickly accomplished. The gage glass 17 is protected against external blows and shocks and upon the event of rupture of the gage glass 17 due to internal pressure any escaping pressure fluid or flying glass particles will be diverted so that nearby personnel are safe, and so that the valves 15 can be manually operated for shut off.

The clearance spaces at the top and bottom between the interior of the tube 25 and the exteriors of the gland nuts 18 permit of gradual and directed escape of pressure fluid in addition to fluid discharged through the openings 35 if they are provided.

I claim:

In combination with a sight glass having upper and lower fittings in predetermined spaced relation with a transparent gage tube extending therebetween and having upper and lower adjustable members for retaining said tube in fluid tight relation in said fittings, a gage glass protector comprising an elongated back strip parallel to said gage tube, said back strip having ledges along opposite edges thereof, an elongated transparent tubular member having a slot disposed therealong with the edges of the slot in engagement with said ledges, said slot being of a width greater than the diameter of the gage tube, adjustable clamping straps at each end of said tubular member in engagement with the periphery of said tubular member and with said back strip and retaining said tubular member and back strip in assembled relation, said tubular member being interiorly unobstructed at both its upper and lower ends and being supported by said lower fitting with its lower end in overlapping relation to the lower adjustable member, said tubular member being of lesser length than the distance between said fittings and freely vertically slidable with respect to said gage tube and said fittings for selective access to said adjustable members.

References Cited by the Examiner

UNITED STATES PATENTS

| | | | |
|---|---|---|---|
| 664,019 | 12/00 | Engels | 73—326 |
| 1,459,952 | 6/23 | Ernst | 73—326 |

FOREIGN PATENTS 18,022   1896   Great Britain.

OTHER REFERENCES

Publication: "The Oil and Gas Journal," August 20, 1956, p. 260.

ISAAC LISANN, *Primary Examiner.*